United States Patent [19]
Billings et al.

[11] Patent Number: 4,936,223
[45] Date of Patent: Jun. 26, 1990

[54] SEGMENTED RAIL ASSEMBLY FOR CLOSED LOOP WORK STATION CONVEYOR SYSTEM

[75] Inventors: Larry Billings, Manchester; Richard Kuchta, Tolland, both of Conn.

[73] Assignee: Gerber Garment Technology, Inc., Tolland, Conn.

[21] Appl. No.: 249,596

[22] Filed: Sep. 26, 1988

[51] Int. Cl.⁵ .............................. E01B 25/24
[52] U.S. Cl. ..................... 104/102; 104/91; 104/107; 403/292
[58] Field of Search ............ 104/88, 41, 101, 102, 104/106; 285/404, 282; 403/292, 298, 378, 379, 108

[56] References Cited

U.S. PATENT DOCUMENTS

| 2,610,584 | 9/1952 | Calder | 104/101 |
|---|---|---|---|
| 2,759,239 | 8/1956 | Snyder | 403/292 X |
| 3,858,520 | 1/1975 | Patin | 104/91 X |
| 4,037,788 | 7/1977 | Riley | 403/292 X |
| 4,100,713 | 7/1978 | Shoe | 403/292 X |
| 4,615,273 | 10/1986 | Osthus et al. | 104/172.4 X |
| 4,700,633 | 10/1987 | Weiselfish et al. | 104/102 |

FOREIGN PATENT DOCUMENTS

| 2255407 | 5/1974 | Fed. Rep. of Germany | 403/292 |
|---|---|---|---|
| 2462233 | 8/1976 | Fed. Rep. of Germany | 104/107 |

Primary Examiner—Andres Kashnikow
Assistant Examiner—Matthew C. Graham
Attorney, Agent, or Firm—McCormick, Paulding & Huber

[57] ABSTRACT

A subsidiary work station loop for a work station conveyor system has a gravity fed rail assembly for trolleys shunted from the main conveyor. An elevator returns the trolleys from the lower end of the rail assembly. Four rail segments define this rail assembly and three of the four are supported by a single bracket and a single fastener. The rail segments are coupled by a pin and slot connection that permits limited angular rotation of one segment relative to the other, but which prevents relative axial misalignment.

11 Claims, 7 Drawing Sheets

SEGMENTED RAIL ASSEMBLY FOR CLOSED LOOP WORK STATION CONVEYOR SYSTEM

BACKGROUND OF THE INVENTION

This invention relates generally to workpiece conveyor systems of the type disclosed in issued U.S. Pat. No. 4,615,273 entitled "Conveyorized Transport System" and assigned to the assignee herein. A related application Ser. No. 249,442 filed concurrently herewith and entitled "Transfer Slide Assembly and System" and said issued U.S. Pat. No. 4,615,273 are incorporated by reference herein.

Workpiece conveyor system of the type with which this invention is concerned may, for example, be used in a garment making plant to carry workpieces to a series of work stations. Without such a system a garment worker, in addition to performing a particular work operation on each piece, often has to punch a label attached to each workpiece to make a record of its status, sort the workpieces, and transport them manually to and from the various work stations. These additional steps cause the typical garment worker to consume time, and create other problems in the assembly process. For example, the time it takes a worker to perform various tasks is generally unpredictable and difficult for supervisory personnel to keep track of. Also, it is difficult to keep track of the workpieces and the time required as they travel to and from various stations. In order to provide a more accurate scheduling of such work it is common for operators to accummulate many workpieces before carrying them to a subsequent work station, so considerable inventory may be tied up in a factory, introducing excessive costs to the manufacturer. Furthermore, accummulating workpieces in such piles tends to make accurately updated quality control inspections more difficult.

As disclosed in the above mentioned U.S. Pat. No. 4,615,273 a conveyorized transport system is provided having a main rail upon which trolleys ride, and having closed subsidiary loops located alongside the main rail, each such loop leading to and from an individual work station. Switching means is provided for each such loop for transferring trolleys between the main rail and such subsidiary loops. These loops each have an entrance and an exit end, the entrance being upstream of the exit relative to the general direction of trolley movement on the main conveyor. This switch is able to deliver a trolley to the entrance and to receive a trolley from the exit of each loop.

This loop configuration provides flexibility in routing because it allows trolleys to be routed in two or more ways from the exit of a subsidiary loop. In accordance with one feature of the above mentioned patent a trolley switches between the main rail and a subsidiary loop and is positively propelled by a series of spaced pushers so that the switching is reliable and consistent. The main rail and subsidiary loop each have a gap and the switch comprises a rail section that can be moved during switching from a first position bridging in the gap in the main rail to a second position bridging the gap in the subsidiary loop to provide for transfer of the trolley from the main rail to the subsidiary loop. This type of switch also allows the trolley to be routed from one subsidiary loop to another located directly across the main rail, or vice versa, or from the discharge end of the subsidiary loop directly to the entrance of the same subsidiary loop for recirculation purposes.

As further described in said prior art patent each closed subsidiary loop includes an inclined gravity rail portion for feeding the trolleys to and through a work station, and includes an elevator means for lifting the trolleys from the lower end of the gravity rail assembly to a point and to a level where the trolleys can be reloaded on the main conveyor track.

The primary aim of the present invention is to provide an improved gravity rail assembly for the subsidiary loop or loops of a conveyorized transport system of the type shown and described in U.S. Pat. No. 4,615,273.

SUMMARY OF THE INVENTION

The present invention resides in a workpiece conveyor system wherein trolleys travel along a main conveyor track and are systematically shunted into a series of closed subsidiary loop conveyor systems where the workpieces are subjected to either manual or automated processing steps.

At least some of these closed loop conveyor systems associated with said work stations comprises an inclined gravity assembly having an upper end adjacent the main conveyor track for the trolleys shunted from the main conveyor track to the upper end of the inclined rail assembly. A lower end of the inclined rail assembly is spaced below and to one side of that upper end, and elevator means is provided for lifting the trolleys from the lower end to a level where these trolleys can be reloaded on the main conveyor track. As mentioned in said prior art patent such reloading may be accomplished by the same switching means as used to shunt the trolleys from the main conveyor or additional means may be provided for this purpose.

Bracket means is provided for supporting the rail assembly in a generally inclined configuration so that trolleys are gravity fed from the upper to the lower end of the rail assembly itself. The rail assembly comprises a plurality of individual rail segments, and means is provided for coupling one and an adjacent rail segment together in end-to-end relationship in order to define a path from the upper end to the lower end of the rail assembly for the trolleys carried thereby. These rail segments have upper trolley engageable surfaces of generally circular cross sectional contour, and the means for coupling the adjacent rail segments includes a cylindrical plug having one and an opposite end. These plug ends are received in axially aligned cylindrical openings defined by the adjacent rail segments and serve to support the rail segments in axial alignment with one another. Means is provided for coupling these adjacent rail segments to the plug so as to restrain said rail segments from movement axially relative to one another. At least one of each set of adjacent rail segments has coupling means designed to allow limited angular movement of one rail segment relative to the adjacent rail segment.

As a result of the limited angular movement permitted between adjacent rail segments and as a result of the segmented rail configuration itself fabrication of the gravity rail assembly is greatly facilitated, and perhaps more significantly the bracket means provided for supporting the rail assembly need not itself be so precisely assembled as would be the case in the event that the gravity rail portion of the subsidiary conveyor loop were fabricated in either a unitary fashion or even if assembled from segments in the event that such rail assembly were connected to one another without the above described annular flexibility between the adjacent rail segments.

DETAILED DESCRIPTION

Figure 1:
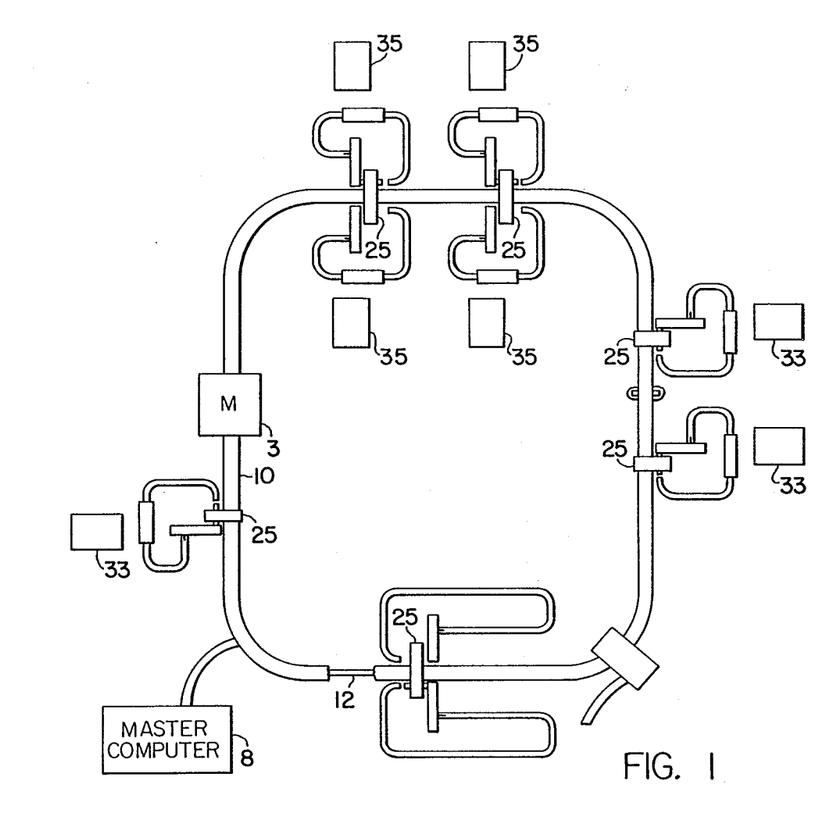
FIG. 1 is a top plan view of a conveyorized transport system such as that shown in U.S. Pat. No. 4,615,273.

Referring now to the drawings in greater detail, FIG. 1 illustrates the workpiece conveyor system of the type shown and described in U.S. Pat. No. 4,615,273. As described in said patent a computer 8 provides the necessary control signals for operating the conveyorized transport system. The conveyor track is illustrated generally at 10, and drive unit 3 moves pushers (not shown) that serve to propel trolleys such as that illustrated at 14 at FIG. 5 along a main conveyor track or rail 12 situated beneath the supporting track structure 10.

A plurality of closed subsidiary loops lead these trolleys to and from individual work stations 33, 35 and as described in said U.S. Pat. No. 4,615,273 transfer switches 25 are provided for systematically shunting these trolleys from the main conveyor track onto an upper end of each subsidiary loop conveyor structure to permit a predetermined task to be performed on the workpiece.

Figure 2:
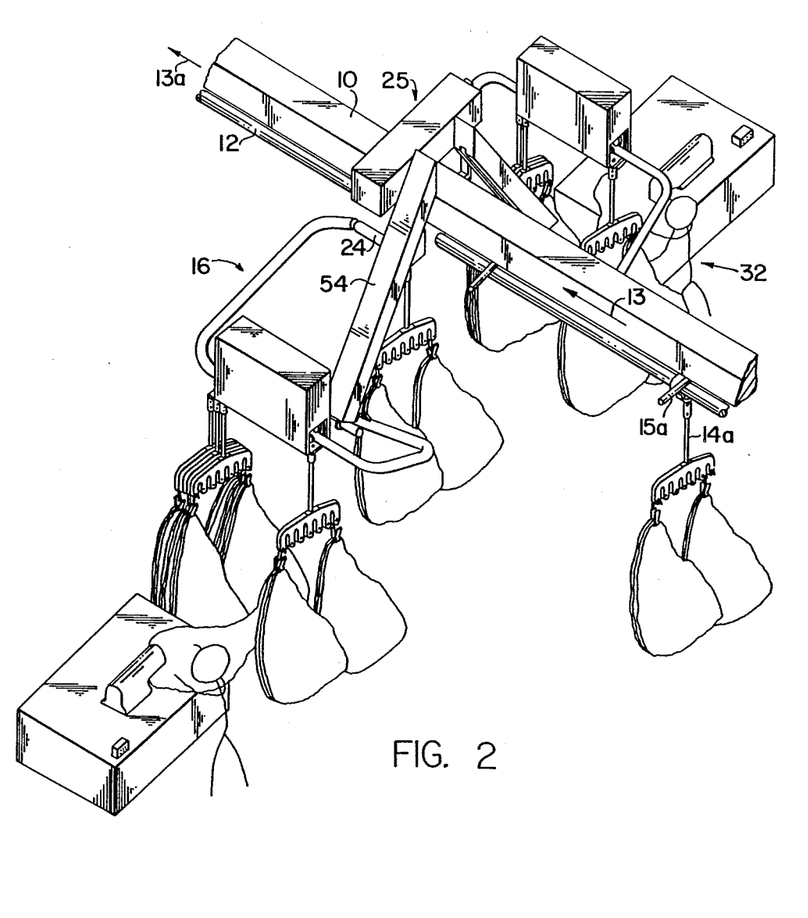
FIG. 2 is a perspective view of a portion of the main conveyor track plus two oppositely disposed closed subsidiary loops associated with two work stations, and also shows a single transfer switch so arranged as to shunt trolleys from the main conveyor onto one or the other of these subsidiary loops, or to shunt such trolleys directly between such work stations.

FIG. 2 illustrates a portion of the computer controlled conveyorized transport system of FIG. 1 and shows the main track or rail 12 together with a pair of opposed subsidiary loops 16 and 32. One of the trolleys 14a rides on the main rail or track 12 and is propelled by a pusher 15a in the direction of the arrow 13. Such pushers are provided in spaced relationship along a chain (not shown) provided for this purpose in the track structure 10. Thus, the trolleys move in the direction of the arrow 13a on the track 12 to a position where they are adapted to be supported on a laterally movable member 24 associated with the transfer switch 25.

Figure 3:
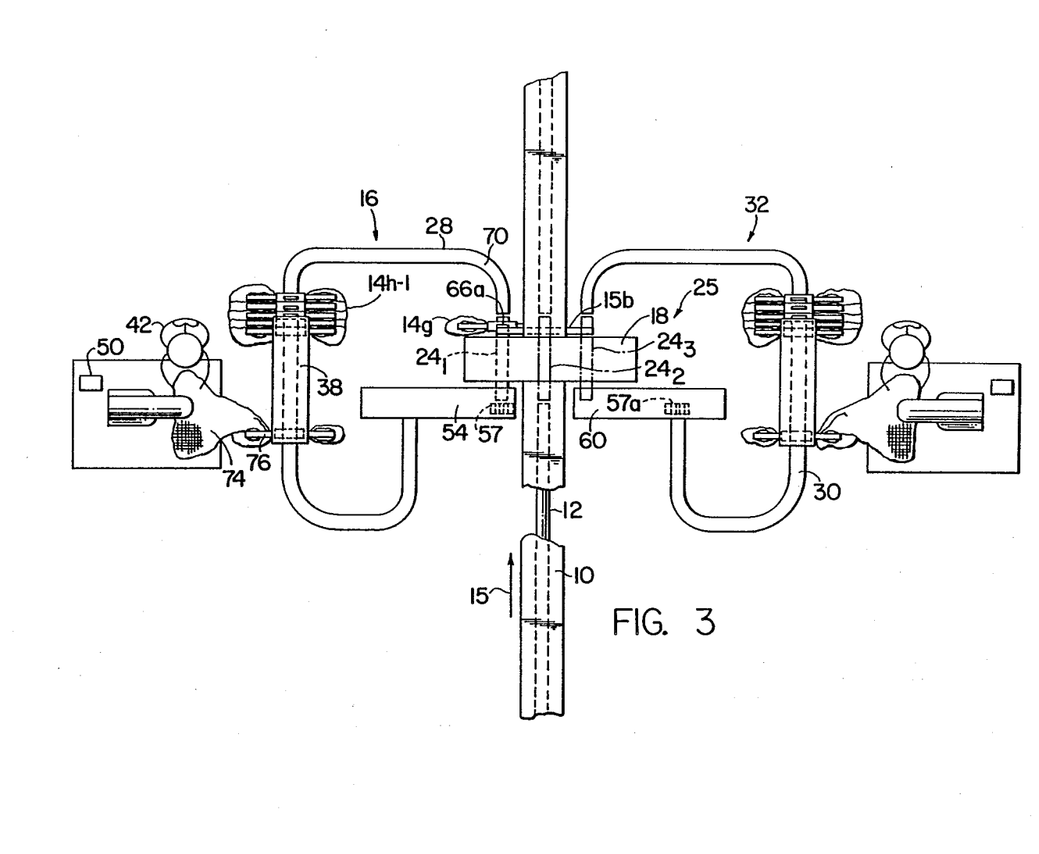
FIG. 3 is a top view of the apparatus illustrated in FIG. 2, and shows the transfer switch in three positions.

FIG. 3 illustrates in some detail the relationship between the transfer switch 25 and the main conveyor track 10 and its associated rail 12. The transfer switch illustrated is capable of three positions, one where its rail segments 24 is aligned with the main track or rail 12 and opposed left and right hand positions where the transfer switch rail segment 24 is aligned with an upper left hand subsidiary loop 16 or with the upper end of a right hand subsidiary loop 32.

Prior to describing in detail the configuration and construction of the gravity fed inclined subsidiary loop rail assemblies it should be noted that in addition to providing for movement of the trolleys from the main conveyor track to each subsidiary loop means is also provided for elevating the trolleys from the lower end of these gravity rail assemblies back to the main conveyor track and preferably said means comprises an elevator 54 that included a car or carrier adapted to receive each trolley 14 at the lower end of the gravity rail assembly. More particularly, each such elevator 54 includes an elevator car 55 that moves from this position (See FIG. 5) upwardly along the path defined by the elevator means 54 to a level where the trolleys can be reloaded onto the main conveyor track by one of the pushers 15a as described above.

Figure 6:
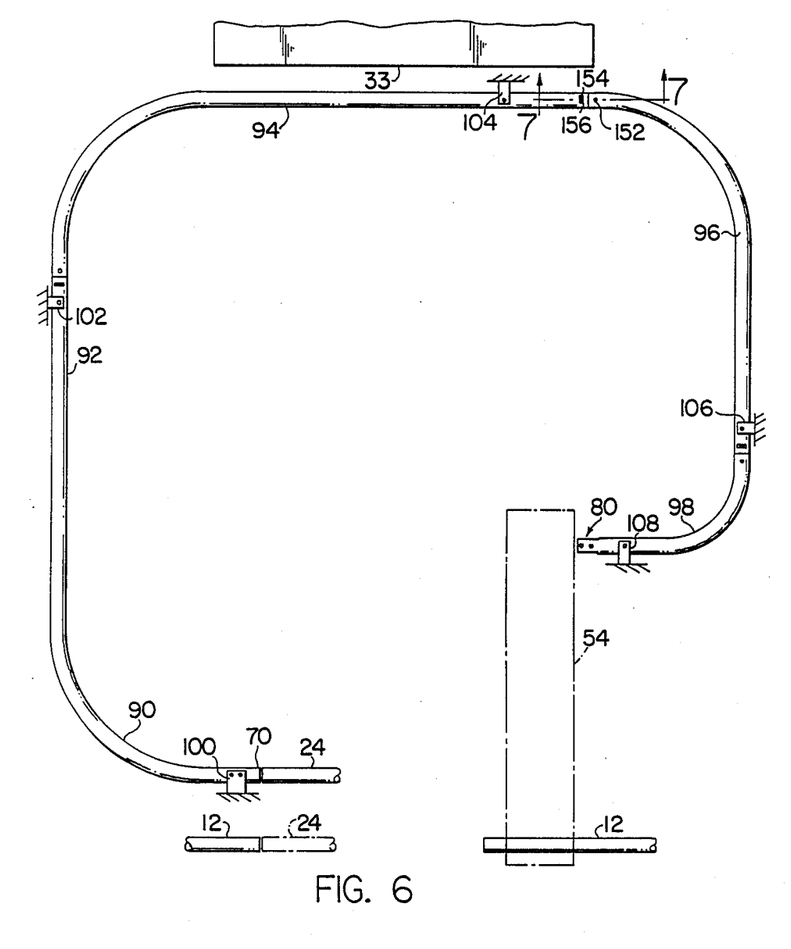
FIG. 6 is bottom plan view of the inclined gravity rail assembly and illustrates, in schematic fashion, the relationship between such assembly, the main conveyor track, the shifting transfer switch and elevator means for lifting the trolleys back to the main conveyor track (portions of the system are omitted in FIG. 6 to better illustrate the segmented configuration of the gravity rails themselves).

Turning now to a more detailed description of the subsidiary or closed loop conveyor system associated with the various work stations. FIG. 3 illustrates two opposed configurations one left and one right hand with groups of trolleys 14h-l inclusively and associated workpieces stacked up awaiting attention by operator 42. Where the workpiece requires a sewing operation the operator may want to delay work on the workpieces while changing thread or for other reasons and in this event the operator may activate a system for recirculating the trolleys on this subsidiary loop all as described in the above mention U.S. Pat. No. 4,615,273. FIG. 3 shows in top plan view the configuration for these left and right hand gravity rail assemblies. FIG. 6 on the other hand shows one such gravity rail assembly from the bottom. FIG. 6 also shows the overhead main conveyor track or rail 12, the transfer slide rail section or segment 24 and the elevator 54 associated with the lower end 80 of the gravity rail assembly. The upper end 70 of the gravity rail assembly is located adjacent to, and at approximately the same level, as the main rail or track 12 so as to receive trolleys from the transfer switch rail section or segment 24 in order to provide for downward movement of the trolley b gravity along the first curving gravity rail segment 90. This rail segment 90 is supported from at least one bracket 100 associated with the upper end 70 and preferably also by a second bracket 102 provided at the opposite end 92 of this first gravity rail segment 90. A second gravity rail segment 94 is generally similar to the first rail segment 90 in that it defines a 90 degree bend and is supported by at least one bracket as indicated generally at 104 in FIG. 6. A third gravity rail segment 96 is supported by at least one bracket 106 and it too defines a 90 degree bend as shown in FIG. 6. Finally, a fourth gravity rail segment 98 is supported by a least one bracket 108 such that the lower end 80 of the gravity rail assembly itself is properly located to achieve the transfer of the trolleys into the elevator 54 and more particularly onto an elevator car 55 so as to facilitate lifting of the trolleys from the lower end 80 generally upwardly and in an inclined fashion back to the level of the main conveyor system all as described in a copending application filed concurrently herewith entitled "Transfer Slide Assembly and System".

Figure 4:
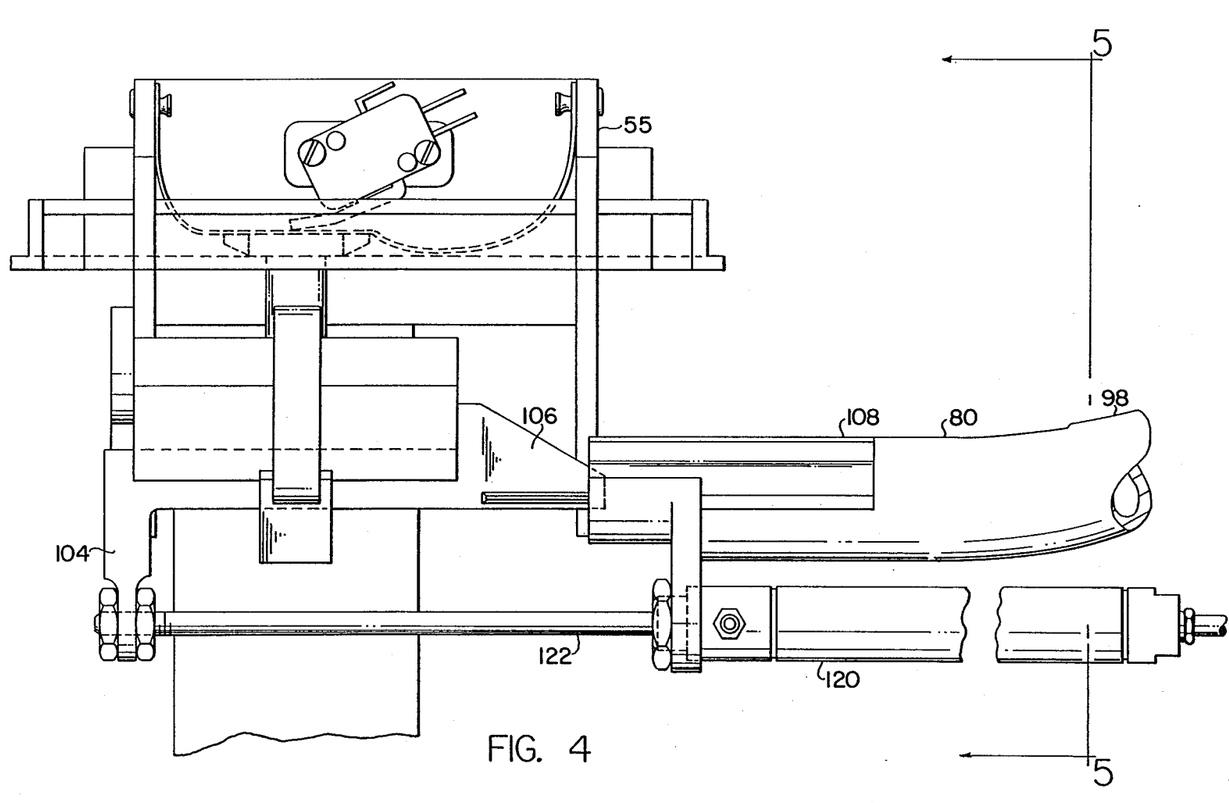
FIG. 4 is a front elevational view of the lower end of the gravity rail assembly illustrating the transfer slide for indexing trolleys from the lower end of the rail assembly onto an elevator car that serves to lift the trolley from the lower end back to a level where the trolley is reloaded on the main conveyor track.
Figure 5:
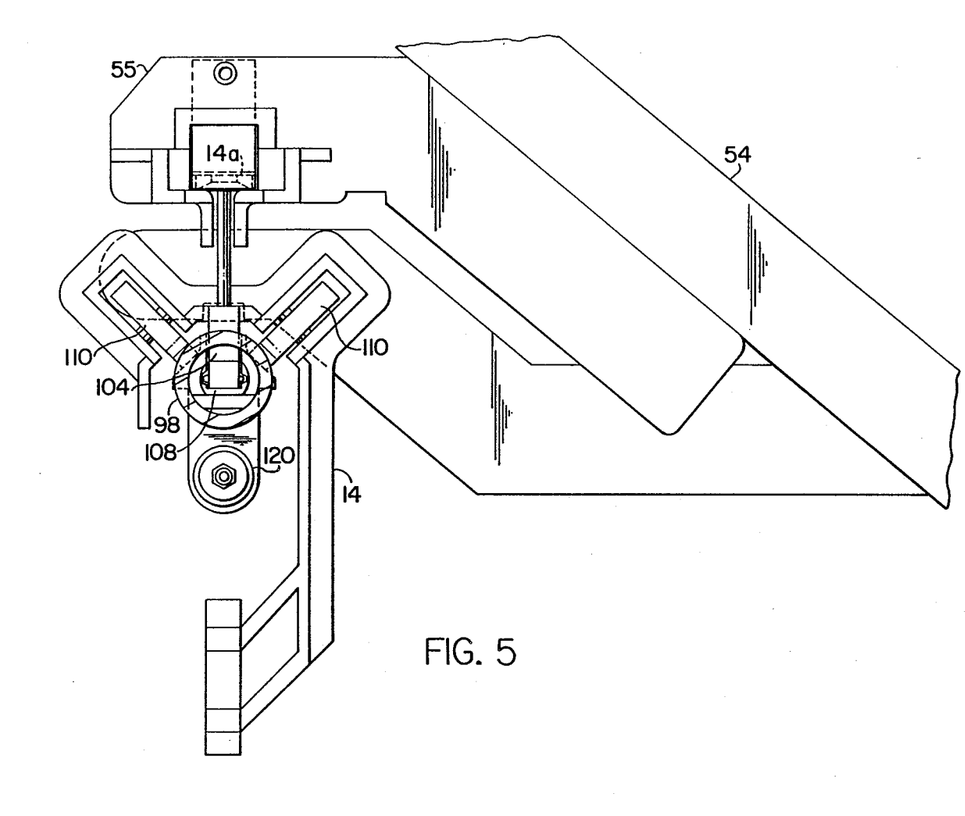
FIG. 5 is a sectional view taken generally on the line 5—5 of FIG. 4 and serves to illustrate the cross sectional configuration for the gravity rail and also shows the trolley carried thereby.

Thus, three of the four rail segments are supported by a single bracket, and by a single fastener or screw. This construction alleviates stress in the assembly, and greatly facilitates the process of assembling the structure. FIG. 4 illustrates the lower end 80 of rail 98 and shows an actuating cylinder 120 having an actuator 122 connected to a movable transfer slide 104 that has a nose 106 slidably received in a fixed end portion 108 provided for this purpose at the lower end 80 of the gravity rail 98 so as to slidably receive the nose 106. As shown in FIG. 5 the trolley 14 is so shaped as to be supported on the tubular gravity rail segment 98 by rollers 110 that are provided for this purpose in the trolley 14. The transfer slide 104 is slidably received in the end portion 108, and is adapted to engage the trolley 14 generally between these rollers 110, 110 for this purpose. Each trolley 14 has an upper end portion 14a that is adapted to be engaged by the pushers 15a, 15a on the main conveyor 12, and the elevator car 55 is adapted to receive this upper portion 14a so that the trolley can be moved up the inclined elevator structure 54 to a level suit-able for return to the main conveyor track 12.

It should be appreciated that the gravity rail assembly illustrated in FIG. 6 occupies a considerable space since the work station (33) provided along one side thereof must permit at least one operator to have sufficient room to achieve the tasks necessary for realizing the results made possible by the series of steps in carrying out the assembly techniques taught in U.S. Pat. No. 4,615,273. While it is possible to construct the gravity rail of FIG. 6 in one piece in a series of bending operations or to construct same from a series of rigidly connected rail sections, and to support such an assembly from a fixed support structure, it has been found that the fabrication of such a structure is difficult and the installation from the brackets also quite difficult. The present invention provides for supporting the gravity rail assembly relative to the main conveyor, and the work station, and the elevator structure without considerable expenditure of time and effort in either fabrication or installation. Further, the fixed support structure for so supporting the gravity feed rail assembly need not be as rigid as would be the case, for example, if the structure was supported from a typical superstructure or factory ceiling. In most cases a superstructure is provided to serve as the support for the conveyor systems for the present invention and in this case a certain degree of misalignment and movement of the superstructure itself is inherent in the design.

In accordance with the present invention, the gravity rail assembly is fabricated in segments that will permit some variation in the locations for the mounting structure or bracket means that support these rail sections. More particularly, a plurality of rail segments are provided each with a substantial bend radius to define the portions of the closed subsidiary loop required. Preferably, four such rail segments are provided each with a single 90 degree bend. Means is provided for coupling the adjacent end portions of these rail segments to one another in accurately aligned relationship. Thus, a consistent path is defined for the trolleys as they travel under the influence of gravity downwardly from the upper end 70 to the lower end 80 of the gravity rail assembly itself. This rail assembly is inclined at a predetermined angle relative to the vertical so as to accurately control the speed of movement for these trolleys. The rail segments have a generally circular cross sectional contour at least along the upper trolley engageable surfaces thereof and preferably these rail segments are tubular in cross-section to provide the requisite degree of strength without unduly adding to the weight of the structure to be supported.

Bracket means in the form of brackets 100, 102, 104, 106 and 108 are provided as shown in FIG. 6 so that at least one bracket is provided for each of the four gravity rail segments. Two brackets 100 and 102 are provided on the uppermost rail segment 90 but only one bracket is provided for each of the other three rail segments as described above. Each bracket has only one fastener connected to its associated rail segment as shown in FIG. 6.

Figure 7:
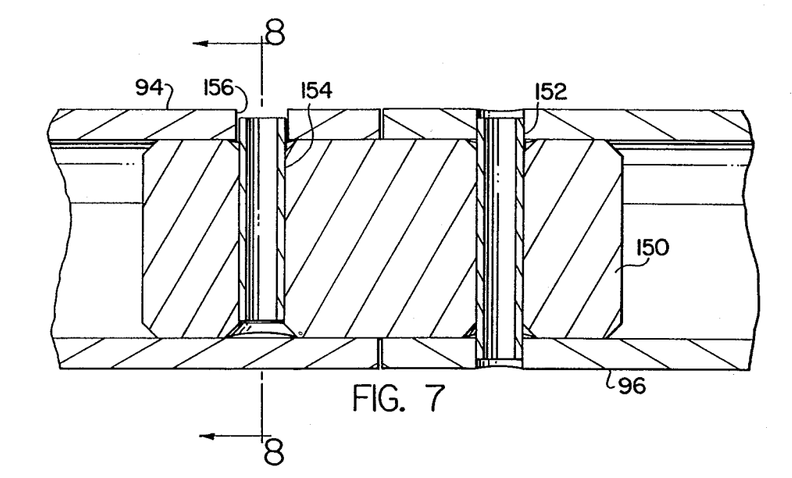
FIG. 7 is a sectional view taken generally on the line 7—7 of FIG. 6 and illustrates the means for coupling the adjacent gravity rail segments to one another.
Figure 8:
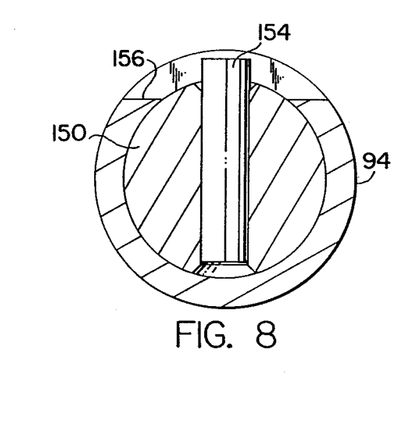
FIG. 8 is a section view taken on the line 8—8 of FIG. 7 and illustrates the slot provided in one of these gravity rail segments for receiving the projecting end portion of a pin provided in the plug coupling to adjacent guide rail or gravity rail segments.

Means is provided for coupling these rail segments and preferably said coupling means includes a cylindrical plug 150 having one and an opposite end received in the axially aligned cylindrical openings defined by the adjacent ends of the tubular rail segments. This plug serves to support the rail segments in accurate axial alignment with respect to one another and means is provided for connecting these adjacent rail segments ends to one another. As shown in FIG. 7 said means comprises pins that are oriented radially of the cylindrical plug and extend into holes in the adjacent end portions of the tubular rails. These pins may comprise roll pins and one of these roll pins, as for example pin 152, serves to anchor the rail 96 securely to the cylindrical plug 150 in a conventional fashion. The other roll pin 154 on the other hand is secured only in the plug 150 and has only one end portion received in a slot 156 provided for this purpose in the rail segment 94. FIG. 8 illustrates the configuration for this slot 156 and because the roll pin 154 is secured in the plug 150 it will be apparent that limited angular rotation of the plug 150 relative to the rail segment 94 is provided for, as dictated by the depth of this slot. Preferably, the degree of angular motion permitted between the plug 150 and the rail segment 94 is on the order of 5 degrees to 10 degrees.

With four gravity rail segments defining the gravity rail assembly of the present invention three coupling means of the type illustrated in FIGS. 7 and 8 are required. The location for each of the bracket means 102, 104, and 106 is such that each coupling means, between each of the adjacent rail segment end portions, is located in close proximity to an associated bracket. This geometry facilitates assembly and disassembly of the close loop gravity rail assembly. Each segment in turn can be assembled with its associated bracket or brackets with a degree of flexibility to the angular position of one rail segment relative to an adjacent rail segment. Nevertheless, axial alignment of these rail segments is preserved as a result of the unique geometry provided for the coupling means between these rail segments. It should be noted that the single screw fastener and bracket for each rail segment are provided on the bottom of these rails. This is because the trolleys have rollers that engage the upper surface of the rails. Also, the slots 156, 156 in the rails 92, 94, 96 and 98 are provided in the bottoms of these rail segments for the same reason.

We claim:

1. In a workpiece conveyor system wherein trolleys travel along a main conveyor track and are systematically shunted into work stations, a closed loop conveyor system for at least some of these work stations and comprising: an inclined rail assembly having an upper end adjacent the main conveyor track for the shunted trolleys, a lower end of said inclined trail assembly spaced below and to one side of said upper end, elevator means for lifting the trolleys from said lower end to a level where the trolleys can be reloaded on the main conveyor track, bracket means for supporting said rail assembly in a generally inclined configuration so trolleys are gravity fed from said upper to said lower end, said rail assembly including a plurality of rail segments, means coupling one and an adjacent rail segment together and in end-to-end relationship to define a path from said upper end to said lower end, said rail segments having upper trolley engageable surfaces of generally circular cross sectional contour, said means coupling said adjacent rail segments including a cylindrical plug having one and an opposite end, said plug ends received in axially aligned cylindrical openings defined by said adjacent rail segments for supporting said rail segments in axial alignment with respect to one another, means connecting said adjacent rail segments to said plug to restrain said segments from movement axially relative to one another, said means connecting said adjacent rail segments to said plug comprising pins provided in radially extending holes in adjacent end portions of said rails and in said cylindrical plug, at least one of said connecting means allowing limited angular movement of said one rail segment relative said adjacent rail segment, said at least one connecting means comprising a radially extending pin secured in said plug and extending into a slotted opening in the rail segment, the ends of the slot defining the limits of angular movement of said rail segments with respect to one another.

2. The combination of claim 1 wherein said rail segments are of circular cross section, and wherein at least some of said rail segments define at least one bend angle of at least approximately 90 degrees.

3. The combination of claim 2 wherein said rail segments are of tubular cross section so that the open ends of adjacent rail segments define said aligned openings that receive said cylindrical plug.

4. The combination of claim 3 wherein means connecting said adjacent rail segments comprise pins provided in radially extending holes in adjacent end portions of said tubular rails and in said cylindrical plug.

5. The combination of claim 4 wherein said at least one connecting means allowing limited angular movement of said one rail segment relative said adjacent rail segment comprises an oversize hole in at least one of said plug and said tubular rail end portion.

6. The combination of claim 5 wherein said plurality of rail segments comprise at least two.

7. The combination of claim 6 wherein said plurality of rail segments comprise at least four, and wherein each of said four rail segments defines at least one bend of approximately 90 degrees.

8. The combination of claim 7 wherein said bracket means supporting said rail assembly comprise at least one bracket for each rail segment.

9. The combination of claim 8 wherein said elevator means includes a receiver, and wherein said rail segment defining said lower end includes a transfer device contained in part in the open end of said lower end defining rail segments.

10. The combination of claim 9 wherein said angular movement of said rail segments relative said adjacent rail segments comprises at least 5 degrees but not more than 10 degrees.

11. The combination of claim 8 wherein said bracket means further includes a single fastener for each said bracket, each bracket serving as the sole support for each of at least three of said four rail segments.

* * * * *